(12) United States Patent
Shin et al.

(10) Patent No.: US 12,614,804 B2
(45) Date of Patent: Apr. 28, 2026

(54) BATTERY MODULE AND BATTERY PACK COMPRISING SAME

(71) Applicant: LG Energy Solution, Ltd., Seoul (KR)

(72) Inventors: Ju Hwan Shin, Daejeon (KR); Tae Kyeong Lee, Deajeon (KR); Jae Hyun Lee, Daejeon (KR); Hyoung Suk Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 460 days.

(21) Appl. No.: 18/038,523

(22) PCT Filed: Oct. 13, 2022

(86) PCT No.: PCT/KR2022/015528
§ 371 (c)(1),
(2) Date: May 24, 2023

(87) PCT Pub. No.: WO2023/075231
PCT Pub. Date: May 4, 2023

(65) Prior Publication Data
US 2024/0021946 A1 Jan. 18, 2024

(30) Foreign Application Priority Data
Oct. 27, 2021 (KR) ........................ 10-2021-0144831

(51) Int. Cl.
*H01M 50/258* (2021.01)
*H01M 50/211* (2021.01)
(Continued)

(52) U.S. Cl.
CPC ....... *H01M 50/258* (2021.01); *H01M 50/211* (2021.01); *H01M 50/289* (2021.01); *H01M 50/507* (2021.01)

(58) Field of Classification Search
None
See application file for complete search history.

(56) References Cited

U.S. PATENT DOCUMENTS

2007/0184711 A1 8/2007 Thrap et al.
2010/0127565 A1 5/2010 Fukazu et al.
(Continued)

FOREIGN PATENT DOCUMENTS

CN 113193270 A 7/2021
JP 2003187781 A 7/2003
(Continued)

OTHER PUBLICATIONS

International Search Report for PCT/KR2022/015528 mailed Jan. 20, 2023. 3 pages.
(Continued)

*Primary Examiner* — Carlos Barcena
(74) *Attorney, Agent, or Firm* — Lerner David LLP

(57) ABSTRACT

A battery module includes a first battery cell assembly in which battery cells are stacked in the thickness direction of the battery cell, a second battery cell assembly in which each battery cell is stacked in a row in the longitudinal direction of the battery cell in the same number as the number of battery cells stacked in the first battery cell assembly, and a module case accommodating the first and second battery cell assembly. The battery cells of the first battery cell assembly are electrically connected to each other, and the battery cells of the second battery cell assembly are electrically connected to each other, but the battery cells are not electrically connected to each other between the first and second battery cell assemblies. Additionally, a battery pack includes the battery module.

15 Claims, 8 Drawing Sheets

(51) Int. Cl.
*H01M 50/289* (2021.01)
*H01M 50/507* (2021.01)

(56) References Cited

U.S. PATENT DOCUMENTS

| | | | |
|---|---|---|---|
| 2011/0045335 A1 | 2/2011 | Lee et al. |
| 2012/0087064 A1 | 4/2012 | Kwon et al. |
| 2013/0065103 A1 | 3/2013 | Yumura |
| 2013/0209862 A1 | 8/2013 | Butzmann et al. |
| 2018/0048033 A1 | 2/2018 | Lee et al. |
| 2018/0151853 A1 | 5/2018 | Mitsuhashi |
| 2019/0181405 A1 | 6/2019 | Kim et al. |
| 2019/0319228 A1 | 10/2019 | Kang |
| 2020/0411814 A1 | 12/2020 | Ju et al. |
| 2021/0050582 A1 | 2/2021 | Yoshida et al. |
| 2021/0288385 A1 | 9/2021 | Jin et al. |
| 2021/0336287 A1 | 10/2021 | Kim et al. |
| 2022/0059901 A1 | 2/2022 | Ren et al. |
| 2022/0285755 A1 | 9/2022 | Chi et al. |
| 2022/0344765 A1 | 10/2022 | Choi et al. |
| 2023/0041144 A1 | 2/2023 | Sun et al. |

FOREIGN PATENT DOCUMENTS

| | | | |
|---|---|---|---|
| JP | 200471178 A | 3/2004 |
| JP | 2008192570 A | 8/2008 |
| JP | 2009-520330 A | 5/2009 |
| JP | 2009152135 A | 7/2009 |
| JP | 2009187972 A | 8/2009 |
| JP | 2010-130713 A | 6/2010 |
| JP | 2011508389 A | 3/2011 |
| JP | 2012-85504 A | 4/2012 |
| JP | 2012523087 A | 9/2012 |
| JP | 2013528899 A | 7/2013 |
| JP | 2015041605 A | 3/2015 |
| JP | 2016143576 A | 8/2016 |
| JP | 2018049823 A | 3/2018 |
| JP | 201888333 A | 6/2018 |
| JP | 202077526 A | 5/2020 |
| JP | 2020-522845 A | 7/2020 |
| JP | WO2019150704 A1 | 1/2021 |
| KR | 20150022468 A | 3/2015 |
| KR | 20150059515 A | 6/2015 |
| KR | 20190069873 A | 6/2019 |
| KR | 102009443 B1 | 8/2019 |
| KR | 102172518 B1 | 10/2020 |
| KR | 20200131500 A | 11/2020 |
| KR | 20210046340 A | 4/2021 |
| KR | 20210108452 A | 9/2021 |
| KR | 20230047813 A | 4/2023 |
| KR | 20230059591 A | 5/2023 |
| KR | 20230059597 A | 5/2023 |
| WO | 2006109610 A1 | 10/2006 |
| WO | 2011148641 A1 | 12/2011 |
| WO | 2020145539 A1 | 7/2020 |
| WO | 2021/025473 A1 | 2/2021 |
| WO | 2021/075690 A1 | 4/2021 |

OTHER PUBLICATIONS

Extended European Search Report including Search Opinion from EP Appl. No. 22887434.3, dated Oct. 30, 2024, pp. 1-11.

[FIG. 1]
(a)
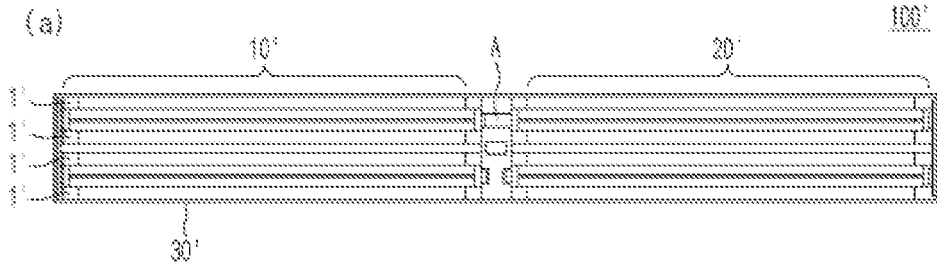
(b)
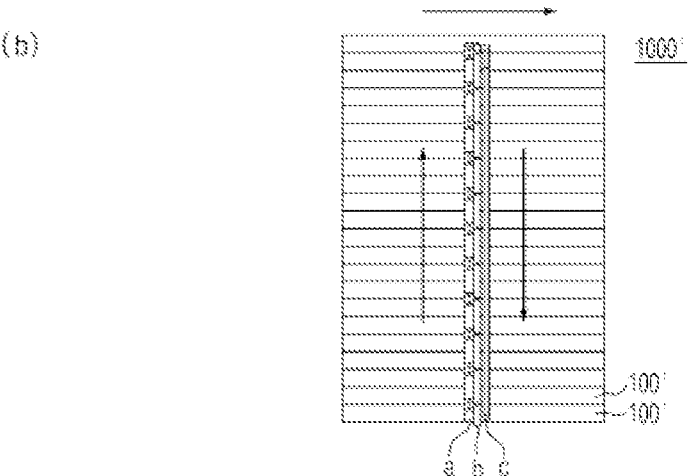
[FIG. 2]
(a) TR
(b) TR
(c) TR
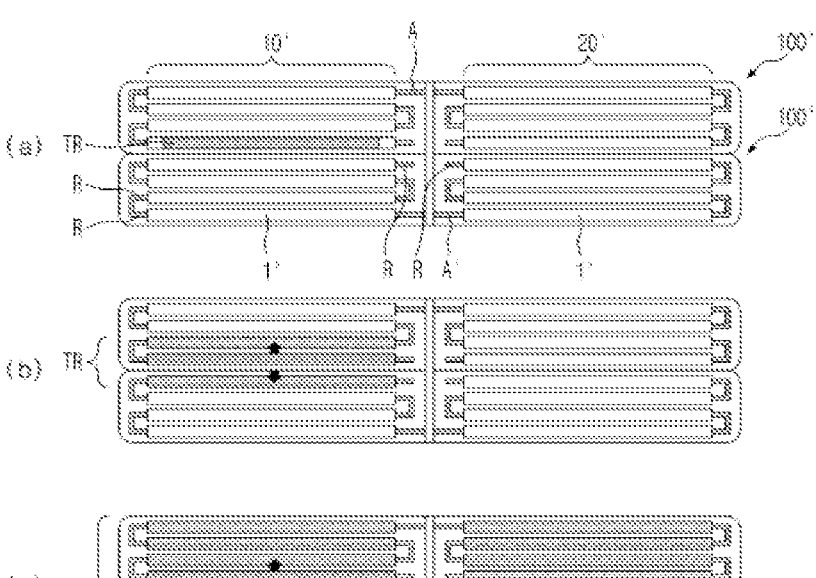

[FIG. 3]
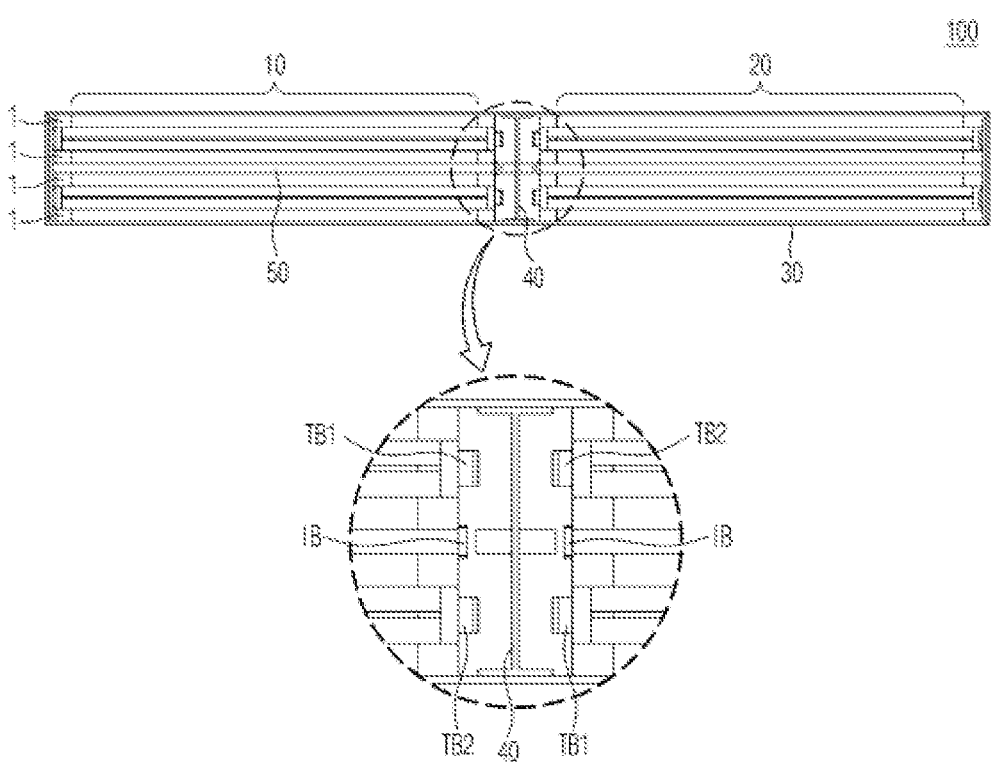

[FIG. 4]
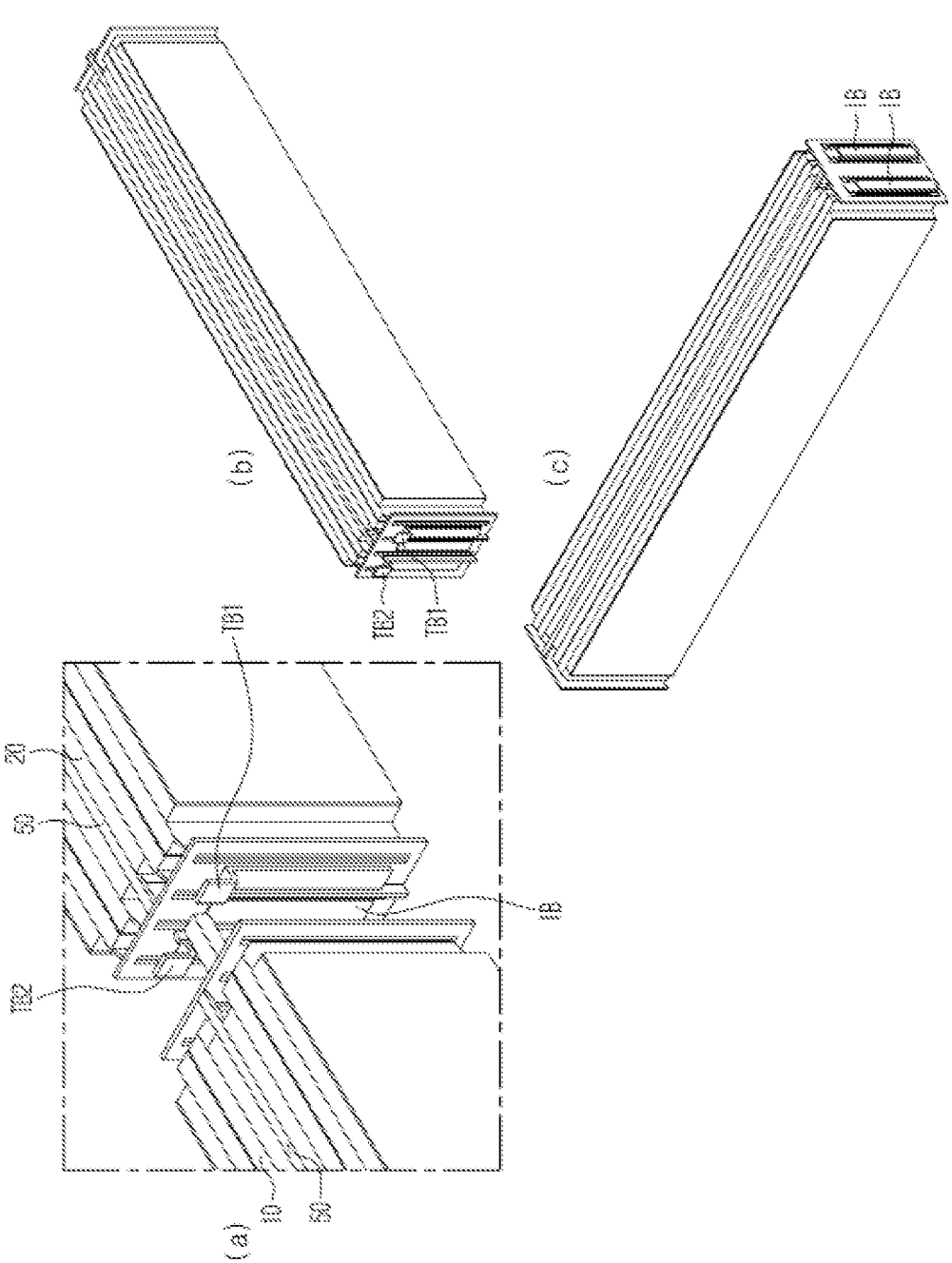

[FIG. 5]
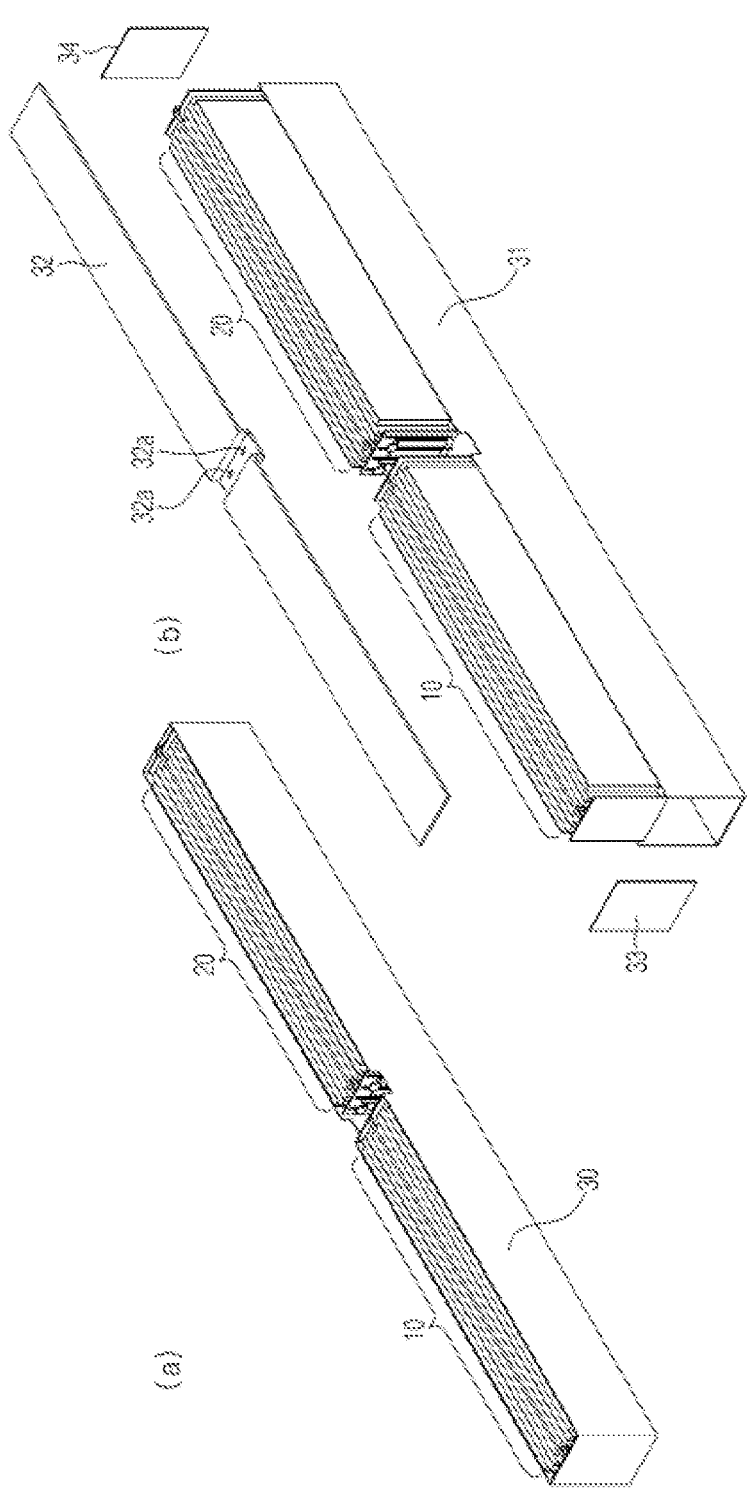

[FIG. 6]
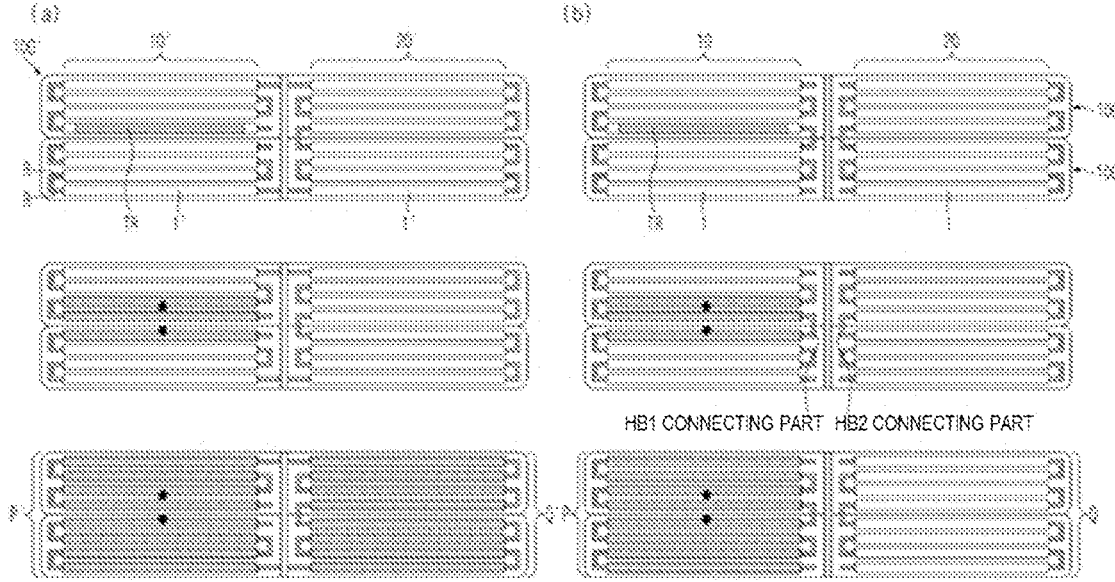
HB1 CONNECTING PART   HB2 CONNECTING PART

[FIG. 7]
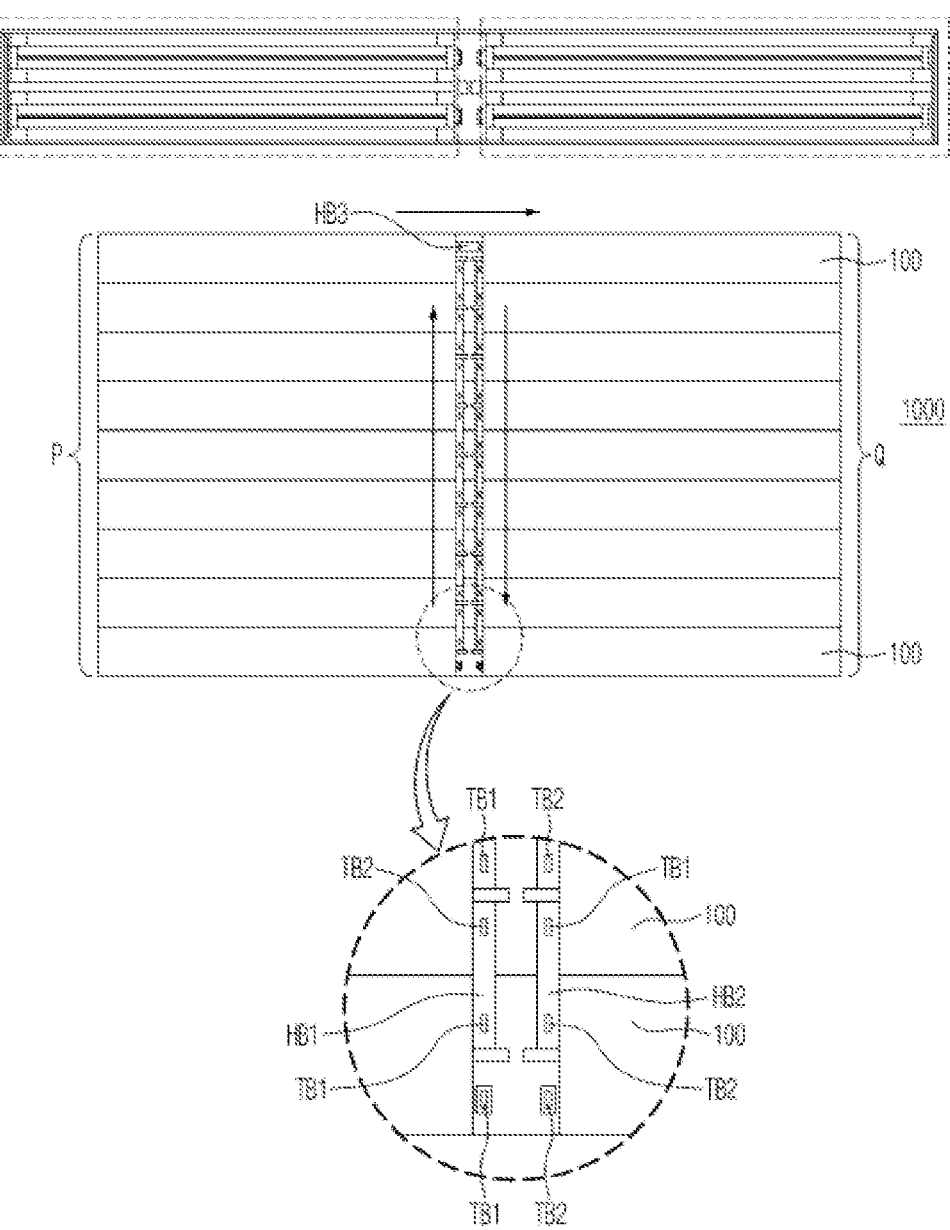

[FIG. 8]
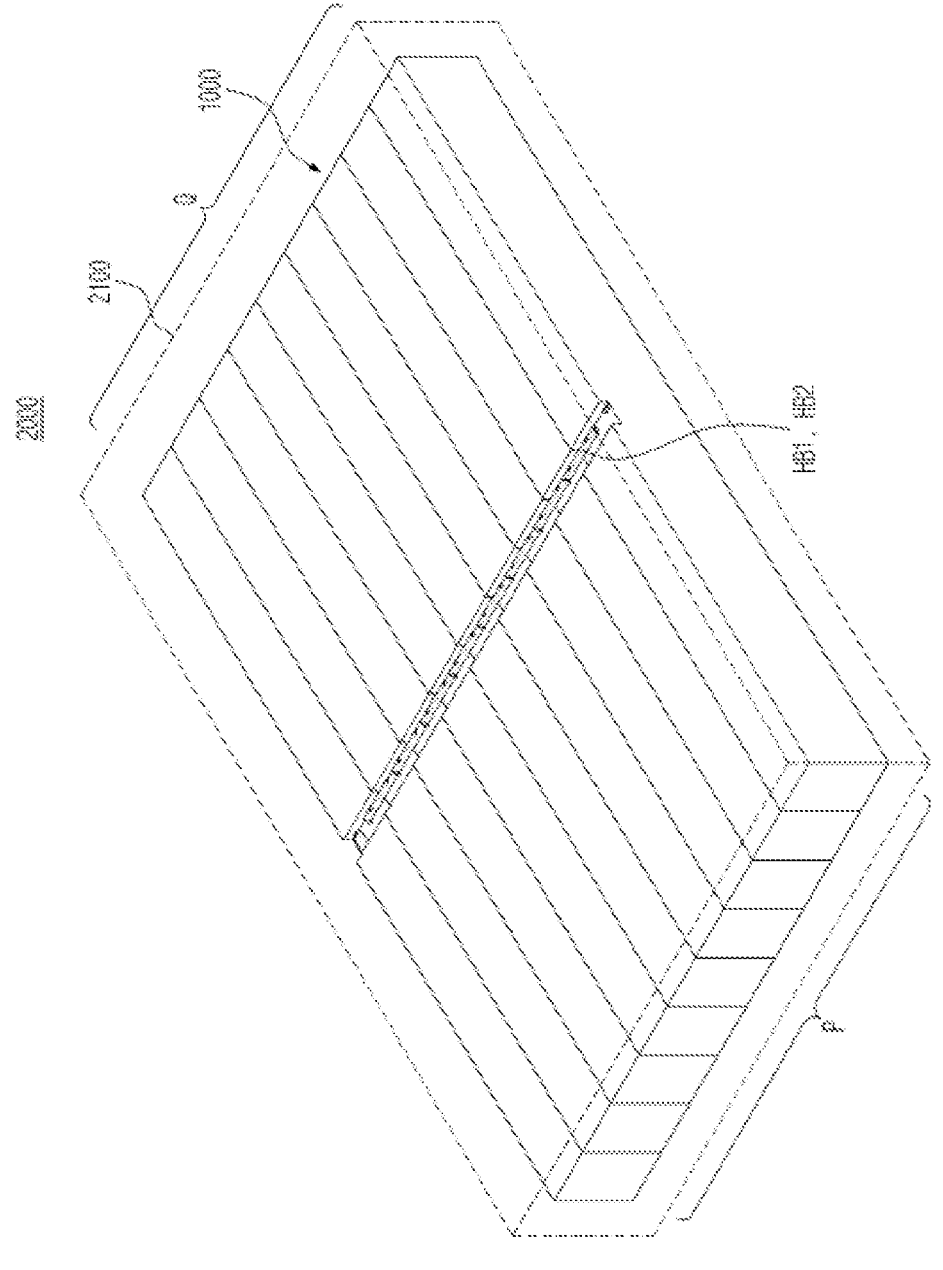

[FIG. 9]
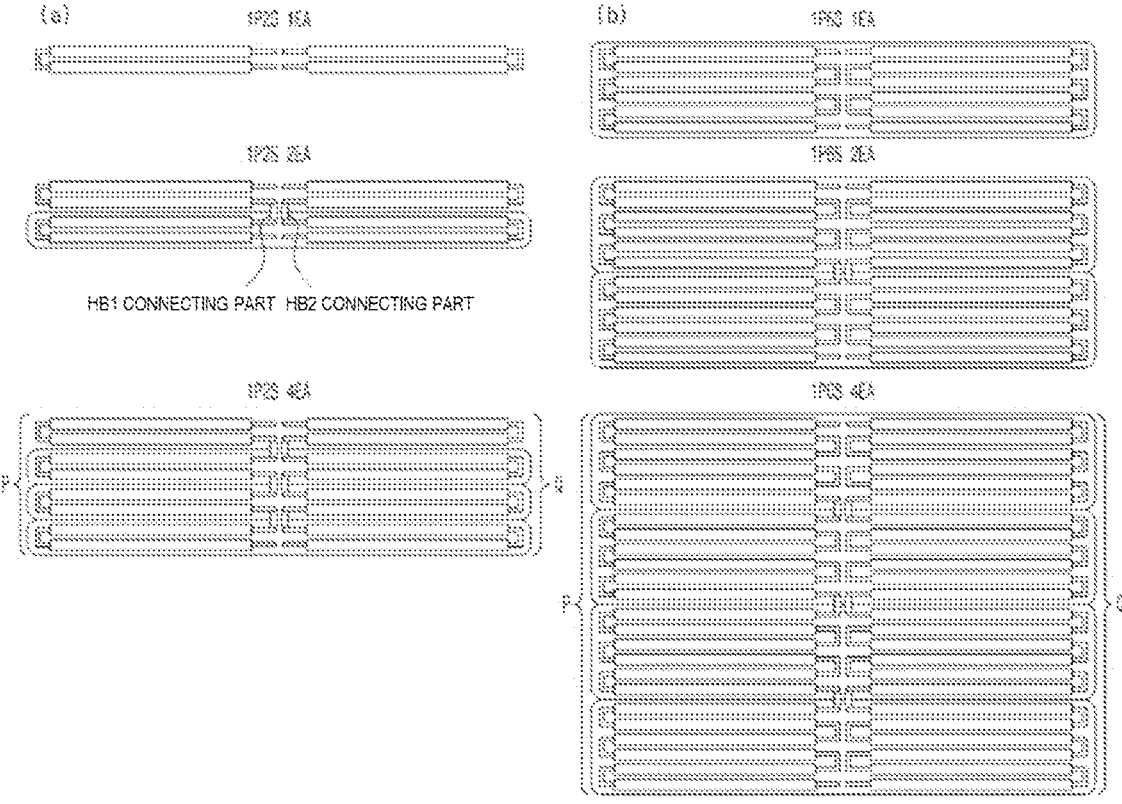

BATTERY MODULE AND BATTERY PACK COMPRISING SAME

CROSS-REFERENCE TO RELATED APPLICATIONS

The present application is a national phase entry under 35 U.S.C. § 371 of International Application No. PCT/KR2022/015528 filed on Oct. 13, 2022, which claims the benefit of priority based on Korean Patent Application No. 10-2021-0144831 filed on Oct. 27, 2021, all contents of which are incorporated herein by reference.

TECHNICAL FIELD

The present disclosure relates to a battery module and a battery pack including the same.

More specifically, it relates to a battery module and a battery pack that can prevent an internal short circuit from being electrically formed due to a simple electrical connection structure.

Background Technology of the Invention

Recently, secondary batteries capable of charging and discharging have been widely used as energy sources of wireless mobile devices. In addition, the secondary battery has attracted attention as an energy source of electric vehicles, hybrid electric vehicles, and the like, which are proposed as a solution for air pollution and the like of existing gasoline vehicles and diesel vehicles using fossil fuels. Accordingly, the types of applications using the secondary battery have diversified due to the advantages of the secondary battery, and it is expected that the secondary battery will be applied to many fields and products in the future.

In addition, as an Energy Storage System (ESS) and a power source for an electric vehicle, or the like, there is an increasing demand for a battery module accommodating a plurality of secondary batteries electrically connected in series or in parallel and a battery pack composed of the battery modules.

Such a battery module or battery pack includes an external housing made of a metal material to protect a plurality of secondary batteries from external impacts or receive and store the secondary batteries.

FIG. 1 is a plan view (part (a)) showing an example of a structure of a battery module 100' having expandability proposed by the present applicant, and a plan view (part (b)) of a battery module stack 1000' configured by stacking the battery modules 100', and FIG. 2 is a schematic diagram showing an electrical path of the battery module stack 1000' composed of the battery modules of FIG. 1.

The present applicant has invented a battery module 100' accommodating an electrode assembly composed of a first battery cell assembly 10' in which a plurality of battery cells 1' are stacked in the battery cell thickness direction, and a second battery cell assembly 20' facing the first battery cell assembly 10' in the battery cell longitudinal direction and comprising a plurality of battery cells in the battery cell thickness direction in the same way as the first battery cell assembly 10', in a rectangular parallelepiped shape module case 30' elongated in the longitudinal direction. Such a battery module 100' accommodates a relatively small number of battery cells in each module case 30', and stacks the battery modules in the longitudinal direction or the thickness direction of the battery cell like Lego blocks, so that a battery pack may be freely configured in consideration of the space where the battery module 100' is installed or the installation space of the battery pack. As such, since the battery module 100' proposed by the present applicant can manufacture various types of battery packs based on the stacking (designing) method, it can be referred to as an expandable battery module.

However, the expandable battery modules proposed so far had a structure in which the first and second battery cell assemblies 10', 20' facing each other in the longitudinal direction are electrically connected to each other. Referring to FIG. 1, the battery cells in the lower two rows of the first and second battery cell assemblies 10', 20' are not connected to each other, but the battery cells in the upper two rows of the first and second battery cell assemblies 10', 20' are electrically connected to each other (refer to the electricity connecting part of A in FIG. 1).

However, the expandable battery module with this electrical connection structure has the following problems.

Since the first and second battery cell assemblies 10', 20' are electrically connected, the electrical connection structure of the battery module itself becomes complicated, and as a result, in the case of stacking a battery module including the first and second battery cell assemblies 10', 20', a total of three lines (a, b, c) of high voltage busbars are required as shown in part (b) of FIG. 1 to electrically connect between the battery cell assemblies of each battery module.

In particular, referring to FIG. 2, when thermal runaway (hereinafter referred to as 'TR' for short) occurs in some of the battery cells of the stacked battery module 100', there has been a problem in that an internal short circuit is formed. That is, in part (a) of FIG. 2, adjacent battery modules are only electrically connected to each other by the above-described high voltage busbars, and the battery cells between each module should not be directly connected to each other. However, when thermal runaway occurs in one battery cell 1', the battery cell 1' is melted and comes into contact with the module case 30', and thermal runaway is propagated to the module case 30' of the adjacent module and the battery cell 1' located inside the module case. Accordingly, as shown in part (b) of FIG. 2, thermal runaway proceeds along the stacking direction of the battery modules, so that thermal runaway propagates between the first battery cell assemblies 10' of the left battery modules. However, since the first battery cell assembly 10' of the battery modules is electrically connected to the second battery cell assembly 20' of each battery module, respectively, even the second battery cell assembly 20' becomes short-circuited, thereby an electrical internal short circuit is formed in the entire battery module 100' or the battery module stack 1000' (see part (c) of FIG. 2). As such, if a short circuit is formed inside a battery module or a battery pack, gas is rapidly generated and overheated, thereby danger of explosion of a battery pack increases.

Therefore, in terms of a battery module having expandability and a battery pack constituted by the same, a development of technology capable of preventing or delaying the generation of an internal short circuit during thermal runaway while maximizing the use of internal space by simplifying the electrical connection structure is required.

DESCRIPTION OF THE INVENTION

Technical Problem

An aspect of the present invention was made to solve the above problems, and it is directed to provide a battery module and a battery pack that can simplify the electrical connection structure by excluding the electrical connection between two battery cell assemblies constituting the expandable module and can prevent the occurrence of an internal short circuit.

Technical Solution

The battery module according to an aspect of the present invention for solving the above problems includes: a first battery cell assembly in which a plurality of battery cells are stacked in the thickness direction of the battery cell; a second battery cell assembly in which each battery cell arranged in a row in the longitudinal direction of the battery cell, with respect to each battery cell stacked in the first battery cell assembly, is stacked in the thickness direction of the battery cell in the same number as the number of battery cells stacked in the first battery cell assembly; and a module case accommodating the first and second battery cell assembly, wherein the battery cells of the first battery cell assembly are electrically connected to each other, and the battery cells of the second battery cell assembly are electrically connected to each other, but the battery cells are not electrically connected to each other between the first and second battery cell assemblies.

As an example, the battery cells constituting the first battery cell assembly and the second battery cell assembly may be pouch cells from which electrode leads of different polarities are protruded from both ends.

As an example, the number of stacked battery cells of the first battery cell assembly and the second battery cell assembly is an even number.

Specifically, the battery cells included in the first battery cell assembly and the second battery cell assembly are electrically connected to the electrode leads of adjacent battery cells so as to form an electrical path connected in a zigzag direction, respectively, and both ends of the electrical path may be electrode leads that are protruding toward the gap between the first and second battery cell assemblies among the electrode leads at both ends of the battery cells included in the first and second battery cell assemblies.

In addition, the electrode leads of the battery cells included in the first and second battery cell assemblies, which are each protruding toward the gap between the first and second battery cell assemblies, have opposite polarities.

Additionally, a terminal busbar may be coupled to the electrode leads respectively protruding from the first and second battery cell assemblies toward the gap between the first and second battery cell assemblies.

As an example, electrode leads of adjacent battery cells are coupled through an inter busbar or directly coupled by being bent to each other so as to form an electrical path connected in the zigzag direction.

As another example, a first partition extending in the battery cell thickness direction may be installed between the first battery cell assembly and the second battery cell assembly.

In addition, a second partition extending in the longitudinal direction of the module case may be provided in the middle part of the battery cells stacked in the thickness direction of the first battery cell assembly and the second battery cell assembly.

As another aspect of the present invention, the battery pack includes a battery module stack in which a plurality of the battery modules are stacked in the thickness direction of the battery cells. The first battery cell assemblies of battery modules stacked in the thickness direction are electrically connected to each other to constitute a first electric block, and the second battery cell assemblies are electrically connected to each other to constitute a second electric block. Except for the first and second battery assemblies of battery modules stacked at the top of the battery module stack, each of the first and second battery cell assemblies constituting the first electric block and the second electric block is not electrically connected to each other.

The first and second battery cell assemblies of battery modules stacked at the top of the battery module stack are electrically connected by a high voltage busbar to electrically connect the first electric block and the second electric block.

As an example, a first high voltage busbar electrically connecting the first battery cell assemblies to each other and a second high voltage busbar electrically connecting the second battery cell assemblies to each other may be installed on the battery module in the stacking direction of the battery module in order to constitute the first electric block and the second electric block.

Specifically, the first high voltage busbar is connected to a terminal busbar coupled to an electrode lead of a battery cell protruding from the first battery cell assembly toward the gap between the first battery cell assembly and the second battery cell assembly of the battery module, and the second high voltage busbar is connected to a terminal busbar coupled to an electrode lead of a battery cell protruding from the second battery cell assembly toward the gap between the first battery cell assembly and the second battery cell assembly of the battery module.

As an example, the electrical connection structure of the first and second battery cell assemblies is a 1PNS structure, and N is an even number.

Advantageous Effects

According to an aspect of the present invention, the electrical connection structure of an expandable battery module including two battery cell assemblies and a battery pack formed by stacking the battery modules can be greatly simplified.

In addition, since each battery cell assembly independently constitutes an electric circuit, the formation of an internal short circuit can be delayed as much as possible or controlled to be formed in order. Accordingly, the safety of the battery pack can be further improved.

BRIEF DESCRIPTION OF THE DRAWINGS

FIG. 1 is a plan view showing an example of a structure of a battery module having expandability proposed by the present applicant, and a plan view of a battery module stack configured by stacking the battery modules.

FIG. 2 is a schematic diagram showing an electrical path of a battery module stack composed of the battery modules of FIG. 1.

FIG. 3 is a plan view of a battery module of an embodiment of the present invention and an enlarged view of its main part.

FIG. 4 is a perspective view showing a configuration of an electrode assembly of the battery module of an embodiment of the present invention.

FIG. 5 is an exploded perspective view illustrating an assembly process of the battery module of FIG. 4.

FIG. 6 is a schematic diagram showing an electrical path in the case of stacking the battery modules in an embodiment of the present invention in comparison with the electrical path of FIG. 2.

FIG. 7 is a plan view of an electrical connection structure of a battery module stack in which the battery modules in an embodiment of the present invention are stacked.

FIG. 8 is a perspective view of a battery pack including a battery module stack composed of the battery modules in an embodiment of the present invention.

FIG. 9 is examples showing other stacking structures of the battery module stack composed of the battery modules in an embodiment of the present invention.

REFERENCE NUMERALS

1: BATTERY CELL
10: FIRST BATTERY CELL ASSEMBLY
20: SECOND BATTERY CELL ASSEMBLY
30: MODULE CASE
40: FIRST PARTITION
50: SECOND PARTITION
TB1, TB2: TERMINAL BUSBAR
IB: INTER BUSBAR
TR: THERMAL RUNAWAY BATTERY CELL
HB1, HB2, HB3: HIGH VOLTAGE BUSBAR
R: ELECTRODE LEAD
P: FIRST ELECTRIC BLOCK
Q: SECOND ELECTRIC BLOCK
100: BATTERY MODULE
1000: BATTERY MODULE STACK
2100: BATTERY PACK CASE
2000: BATTERY PACK

DETAILED DESCRIPTION

Hereinafter, the present invention will be described in detail. Prior to this, the terms or words used in the present specification and claims should not be interpreted as being limited to conventional or dictionary meanings and should be interpreted with meanings and concepts which are consistent with the technological scope of the invention based on the principle that the inventors have appropriately defined concepts of the terms in order to describe the invention in the best way.

In this application, it should be understood that terms such as "comprise" or "have" are intended to designate that there is a feature, a number, a step, an operation, a component, a part, or a combination thereof described in the specification, and they do not exclude in advance the possibility of the presence or addition of one or more other features or numbers, steps, operations, components, parts or combinations thereof.

In addition, when a portion, such as a layer, a film, an area, a plate, etc., is referred to as being "on" another portion, this includes not only the case where the portion is "directly on" another portion but also the case where still another portion is interposed therebetween. On the other hand, when a portion, such as a layer, a film, an area, a plate, etc., is referred to as being "under" another portion, this includes not only the case where the portion is "directly under" another portion but also the case where still another portion is interposed therebetween. In addition, to be disposed "on" in the present application may include being disposed at the bottom as well as the top.
(Battery Module)

The battery module according to an embodiment of the present invention includes: a first battery cell assembly in which a plurality of battery cells are stacked in the thickness direction of the battery cell; a second battery cell assembly in which each battery cell arranged in a row in the longitudinal direction of the battery cell, with respect to each battery cell stacked in the first battery cell assembly, is stacked in the thickness direction of the battery cell in the same number as the number of battery cells stacked in the first battery cell assembly; and a module case accommodating the first and second battery cell assembly, wherein the battery cells of the first battery cell assembly are electrically connected to each other, and the battery cells of the second battery cell assembly are electrically connected to each other, but the battery cells are not electrically connected to each other between the first and second battery cell assemblies.

FIG. 3 is a plan view of a battery module in an embodiment of the present invention and an enlarged view of its main part, FIG. 4 is a perspective view showing a configuration of an electrode assembly of the battery module in an embodiment of the present invention, and FIG. 5 is an exploded perspective view illustrating an assembly process of the battery module of FIG. 4.

As illustrated in FIG. 3, the battery module in an embodiment of the present invention includes: a first battery cell assembly 10 in which battery cells 1 are stacked in the thickness direction of the battery cell; a second battery cell assembly 20 in which each battery cell 1 stacked in the first battery cell assembly 10 and each battery cell 1 arranged in a row in the longitudinal direction of the battery cell is stacked in the thickness direction of the battery cell in the same number as the number of battery cells stacked in the first battery cell assembly 10. In the present exemplary embodiment, four first and second battery cell assemblies 10, 20 are stacked in the battery cell thickness direction, respectively. The battery cells of the same layer of the first and second battery cell assemblies 10, 20 are disposed to face each other in the longitudinal direction. As described above, since the two battery cell assemblies are disposed lengthily in the longitudinal direction, the module case 30 accommodating the battery cell assemblies also has a rectangular parallelepiped shape elongated along the longitudinal direction. As shown in the enlarged view of FIG. 3, the battery cells of the first and second battery cell assemblies are respectively connected to the terminal busbars TB1, TB2 located between the first and second battery cell assemblies 10, 20, but it can be seen that the first and second battery cell assemblies 10, 20 are not electrically connected to each other. The terminal busbars are represented as TB1 and TB2 according to their polarities.

The battery cells constituting the first and second battery cell assemblies 10, 20 may employ pouch cells in which electrode leads having different polarities are protruded from both ends of the battery cells, so-called bidirectional pouch cells. In addition, in the expandable module in an embodiment of the present invention, the number of battery cells 1 stacked in the battery cell thickness direction is an even number.

A first partition 40 extending in the battery cell thickness direction may be provided between the first and second battery cell assemblies 10, 20. Heat propagation between the first and second battery cell assemblies 10, 20 can be prevented by the first partition 40. However, in FIG. 4 and FIG. 5, the first partition 40 is not shown for the convenience of illustration. In addition, since the number of battery cells 1 stacked in the battery cell thickness direction is an even number, they can be divided into the same number up and down. That is, a second partition 50 extending in the longitudinal direction of the module case 30 is installed in the middle part (in the example of FIG. 3, it is installed between two upper and lower battery cells) of the battery cells stacked in the thickness direction of the first and second battery cell assemblies 10, 20. The second partition 50 can prevent heat from propagating in the thickness direction.

In the battery module 100 in an embodiment of the present invention, terminal busbars TB1, TB2 are provided between the first and second battery cell assemblies 10, 20. Specifically, in the case of electrically connecting the stacked battery cells, the terminal busbars TB1, TB2 are coupled to the end of the electrical path. As described below, the terminal busbars TB1, TB2 are electrically connected to terminal busbars TB1, TB2 of adjacent battery modules by being coupled to high voltage busbars.

Parts (b) and (c) of FIG. 4 are perspective views of the first or second battery cell assembly constituting the battery module 100 in an embodiment of the present invention viewed from the front side and the rear side, respectively, and part (a) of FIG. 4 is a perspective view showing the side where the first and second battery cell assemblies are disposed to face each other. Referring to FIG. 4, it can be seen that the leads of the battery cell 1 to which the terminal busbars TB1, TB2 are not coupled are electrically connected to each other by an inter busbar IB. In FIG. 4, the inter busbar IB is coupled to the support plate between the terminal busbars TB1, TB2 (refer to part (a) of FIG. 4), and the leads of the battery cells located at the longitudinal ends of the first and second battery cell assemblies 10, 20 are connected to each other by the inter busbar IB (refer to parts (b) and (c) of FIG. 4).

FIG. 5 shows that the first and second battery cell assemblies 10, 20 are accommodated in the module case 30. The module case 30 includes a U-shaped frame 31 having an open top and an upper frame 32 coupled thereto, but is not limited thereto. That is, a C-shaped frame having one side opened and an I-shaped frame coupled thereto may also be used, and other types of module cases 30 may be used as long as they can stably accommodate the battery cell assemblies. The module case 30 includes a front end plate 33 and a rear end plate 34 coupled to the front and rear ends of the battery cell assembly. A concave part is formed in the center of the upper frame 32, and at least one through hole 32a is formed in the concave part so that the terminal part of the terminal busbar coupled to the battery cell assembly can protrude. The terminal part of the terminal busbar protruding through the at least one through hole 32a is coupled to a high voltage busbar to be described below.

FIG. 6 is a schematic diagram showing an electrical path in the case of stacking the battery modules in an embodiment of the present invention compared to the electrical path of FIG. 2.

As shown in FIG. 6, a battery module stack may be formed by stacking a plurality of battery modules in the battery cell thickness direction. A detailed configuration of the battery module stack will be described below in relation to the battery pack.

The electrical connection structures of the battery cell assembly and the battery module stack provided in the battery pack in an embodiment of the present invention will be described by referring to FIG. 3, FIG. 4, and FIG. 6.

Part (a) of FIG. 6 is a description of an electrical path of an electrical connection structure of a battery module stack structure consisting of the first and second battery cell assemblies of FIG. 2, and part (b) of FIG. 6 is a description of an electrical path of an electrical connection structure of a battery module stack structure consisting of the first and second battery cell assemblies in an embodiment of the present invention.

The battery cell assemblies of FIG. 6 are electrically connected to the electrode leads R of each adjacent battery cell so as to form an electrical path in which four battery cells 1/1' stacked in the thickness direction are connected in a zigzag direction. In order to form the electrical path connected in the zigzag direction, the electrode leads R of the battery cells 1/1' adjacent to each other are bent and directly coupled to each other by, for example, welding, or, as shown in FIG. 4, they may be electrically connected through the inter busbar IB.

Both ends of the electrical path connected in the zigzag direction become the electrode lead part protruding toward the gap between the first and second battery cell assemblies, respectively, among the electrode leads at both ends of the battery cells included in the first and second battery cell assemblies 10', 20'/10,20. In this case, the electrode lead parts respectively protruding from the first and second battery cell assemblies 10', 20'/10, 20 have opposite polarities. The above-described terminal busbar is coupled to the electrode lead part of both ends of the electrical path.

Part (a) of FIG. [4]6 and part (b) of FIG. [4]6 are different in that in the example of part (a) of FIG. [4]6, one among the electrode lead parts respectively protruding toward the gap between the first and second battery cell assemblies connects between the first and second battery cell assemblies 10', 20', whereas in the example of part (b) of FIG. [4]6, it does not connect between the first and second battery cell assemblies 10, 20. In part (a) FIG. 6, a first partition 40 extending in the battery cell thickness direction is formed between the first and second battery cell assemblies, so it seems that the electrode lead parts are disconnected in the example of part (a) of FIG. 6, but in reality, they are connected to each other through the first partition 40. When a battery pack is formed by stacking battery modules having such electrical connection structure, the structure becomes complicated such as additionally connecting three high voltage busbars as shown in FIG. 1, but there is a problem in that an internal short circuit is formed. This will be described in more detail in relation to the battery pack of in an embodiment the present invention below.

(Battery Pack)

A battery pack as another aspect of the present invention includes a battery module stack 1000 formed by stacking the above-described a plurality of battery modules 100 in the thickness direction of the battery cell. The first battery cell assemblies 10 are electrically connected to each other to form a first electric block P, and the second battery cell assemblies 20 are electrically connected to each other to form a second electric block Q. Except for the first and second battery cell assemblies 10, 20 stacked on top of the battery module stack 1000, each of the first battery cell assembly 10 and the second battery cell assembly 20 constituting the first electric block P and the second electric block Q are not electrically connected to each other.

The battery pack 2000 in an embodiment of the present invention includes a battery module stack 1000 formed by stacking a plurality of above-described battery modules 100 in which the first and second battery cell assemblies are not electrically connected to each other in the thickness direction of the battery cell. In the battery module stack 1000, the first battery cell assemblies 10 of the battery modules 10 stacked in the thickness direction are electrically connected to each other to form a first electric block P. In addition, in the battery module stack 1000, the second battery cell assemblies 20 of the battery modules stacked in the thickness direction are electrically connected to each other to form a second electric block Q. In the same way that the first and second battery cell assemblies 10 and 20 are not electrically connected at the module end, the battery module stack 1000 provided in the battery pack in an embodiment of the present invention has the first and second electric blocks P, Q that are not electrically connected to each other in principle. That is, since the first and second battery cell assemblies 10, 20 of each battery module constituting the first and second electric blocks P, Q are not electrically connected, the first and second electric blocks P, Q are not electrically connected to each other. However, since the first and second battery cell assemblies of the battery modules stacked on the top of the battery module stack are electrically connected by, for example, a high voltage busbar HB3, the first electric block P and the second electric block Q are electrically connected to each other at the top of the battery module stack 1000. Therefore, referring to FIG. 7, among the nine battery modules constituting the first electric block and the second electric block, the first and second electric blocks P, Q of eight battery modules from the bottom are not electrically connected to each other, but in the ninth battery module, the first and second electrical blocks P, Q are electrically connected.

FIG. 6 and FIG. 7 show an example of the battery module stack.

Part (a) of FIG. 6 is the same as that shown in FIG. 2, and shows that an internal short circuit is formed by thermal runaway. That is, since the battery module stack of part (a) of FIG. 6 is a stack of battery modules 100' in which the first and second battery cell assemblies 10', 20' are electrically connected to each other, when the first battery cell assemblies and second battery cell assemblies of the adjacent battery modules are connected to each other with a high voltage busbar to form electrical blocks P, Q, respectively, the electrical blocks P, Q also become electrically connected. In the case of part (a) of FIG. 6, when thermal runaway TR occurs in one battery cell 1' of the battery cell assembly and propagates to the battery cell 1' of the adjacent battery module, causing the electrical circuit to consequently become connected, an internal short circuit is formed. In this case, the thermal runaway TR is not sequentially propagated, but it may be propagated in a thermal runaway TR propagation sequence jumping from the first battery cell assembly 10' to the second battery cell assembly 20' depending on the internal short circuit. That is, as shown in part (b) of FIG. 1, when electricity flows along an inverted U-shaped path, thermal runaway does not sequentially spread up and down from the part where thermal runaway has occurred, but spreads left and right, etc. due to an internal short circuit and increases in propagation speed. In this case, the amount of gas generated in the battery pack greatly increases, and the risk of explosion also rapidly increases.

On the other hand, in the case of part (b) of FIG. 6, that is, in an embodiment of the present invention, even if thermal runaway occurs in the first battery cell assembly 10 on the left side, thermal runaway is only propagated to the upper and lower battery modules 100 and does not propagate toward the second battery cell assembly 20 on the right side, specifically the second electric block (Q). This is because, in principle, there is no electrical connection between the first and second battery cell assemblies 10, 20 and the first and second electric blocks P, Q, thereby does not form an internal short circuit.

FIG. 7 is a plan view showing an electrical connection structure of a battery module stack in which battery modules according to an embodiment of the present invention are stacked.

FIG. 7 also shows the effect of the battery pack including the battery module stack 1000 in an embodiment of the present invention. As described above, in the battery module stack 1000 in an embodiment of the present invention, except for the battery module 100 stacked on the top of the stack, the first and second electrical blocks P, Q are not electrically connected to each other. Therefore, it is a structure in which the left and right electric block parts P, Q are respectively separately propagated during thermal runaway. However, due to the structure of the battery pack which has to be connected to, for example, electric components of a vehicle, the flow of electricity must be in an inverted U-shape as shown in FIG. 7, so the first and second battery cell assemblies 10, 20 of the battery modules 100 stacked on the top of the battery module stack 1000 need to be electrically connected. However, even in this case, thermal runaway TR does not propagate among the first and second battery cell assemblies 10, 20 of each battery module 100 until it reaches the top, but instead it propagates sequentially. Additionally, an embodiment of the present invention suppresses the occurrence of an internal short circuit in the battery pack, preventing thermal runaway TR from rapidly propagating and allowing it to propagate sequentially, thereby reducing the amount of gas generation and greatly reducing the risk of explosion.

In addition, as shown in FIG. 7, if it is a structure in which the first and second electric blocks P, Q are not electrically connected to each other, when connecting the high voltage busbars HB1, HB2 to the terminal busbars TB1, TB2 provided in the first and second battery cell assemblies 10, 20 of each battery module 100, it is sufficient to be provided with only two high voltage busbars HB1, HB2 extending in the stacking direction of the battery module. That is, there is no need to prepare three high voltage busbars as shown in FIG. 1. Accordingly, the electrical connection structure of the battery pack is greatly simplified. As shown in the enlarged view of FIG. 7, the first and second high voltage busbars HB1, HB2 are coupled to the terminal busbars TB1, TB2 of different polarities exposed to the top of the battery module, respectively, so that they can electrically connect the battery modules 100 to each other.

Meanwhile, the electrical connection between the first and second battery cell assemblies 10, 20 of the battery modules 100 stacked on the top of the battery module stack 1000 may be performed by a high voltage busbar HB3. Specifically, by connecting the high voltage busbars TB1, TB2 coupled to the electrode leads of the battery cells protruding toward the gap between the first and second battery cell assemblies 10, 20 of the battery modules 100 stacked on the top to the high voltage busbar HB3 (third high voltage busbar), it may be possible to implement an inverted U-shaped electrical path in the battery module stack.

FIG. 8 is a perspective view of a battery pack 2000 including a battery module stack 1000 composed of battery modules according to an embodiment the present invention.

The battery module stack 1000 is the same as that shown in FIG. 7, and two high voltage busbars HB1, HB2 are coupled side by side to the center of the first and second electric blocks P, Q in the module stacking direction. When the battery module stack 1000 is accommodated in an appropriate battery pack case 2100, the electrical connection structure is simplified, the utilization of space inside the pack is increased, and a battery pack 2000 capable of preventing the occurrence of an internal short circuit can be obtained.

FIG. 9 is examples showing other stacking structures and electrical connection structures of the battery module stack

100 composed of the battery modules and the battery modules of an embodiment the present invention.

Part (a) of FIG. 9 shows a structure of stacking one, two, and four battery modules in which the first and second battery cell assemblies 10, 20 are formed by stacking two battery cells in the thickness direction inside a single battery module form a battery cell assembly having a 1P2S structure, respectively.

Part (b) of FIG. 9 shows a structure of stacking one, two, and four battery modules in which the first and second battery cell assemblies 10, 20 are formed by stacking six battery cells in the thickness direction inside a single battery module form a battery cell assembly having a 1P6S structure, respectively.

In FIG. 3 to FIG. 6, the electrical connection structure of the first and second battery cell assemblies 10, 20 was a 1P4S structure, respectively. However, as shown in FIG. 9, the electrical connection structure of the battery module may be other structures such as 1P2S and 1P6S. For example, although not shown in FIG. 9, a 1P8S electrical connection structure may also be employed. In short, the electrical connection structure of the first and second battery cell assemblies 10 and 20 may be 1PNS (N is an even number). Regardless of the structure, the first and second battery assemblies 10, 20 between the stacked battery modules 100, the first electric block P formed by connecting the adjacent first battery cell assemblies 10 to each other, and the second electric block Q formed by connecting the second battery cell assemblies 20 to each other are not electrically connected to each other, except for the first and second battery cell assemblies 10, 20 of the battery modules 100 at the end.

As above, the diagrams disclosed in the present invention are not intended to limit but to explain the technological idea of the present invention, and the scope of the technological idea of the present invention is no limited by these diagrams. The technological scope of the present invention should be construed according to the following claims, and all technological ideas within the equivalent scope should be construed as being included in the scope of rights of the present invention.

Meanwhile, terms indicating directions such as up, down, left, right, front, and back are used in this specification, but these terms are only for convenience of description and may vary depending on the position of the target object or the position of the observer.

The invention claimed is:

1. A battery module, comprising:
a first battery cell assembly having a plurality of battery cells stacked in a thickness direction of each of a plurality of battery cells;
a second battery cell assembly having a plurality of battery cells arranged adjacent to the first battery cell assembly along a longitudinal direction of each of the plurality of battery cells of the first battery cell assembly, wherein each of the plurality of battery cells in the second battery assembly is stacked in the thickness direction so as to correspond to each of the plurality of battery cells in the first battery cell assembly, wherein a number of battery cells stacked in the first battery cell assembly is the same as a number of battery cells stacked in the second battery cell assembly;
a module case configured to accommodate the first and second battery cell assemblies; and
a first partition disposed within the module case and separating the first battery cell assembly from the second battery cell assembly within the module case, wherein, the plurality of battery cells of the first battery cell assembly are electrically connected to each other and the plurality of battery cells of the second battery cell assembly are electrically connected to each other, wherein the first partition prevents the plurality of battery cells of the first battery cell assembly from electrically connecting to the plurality of battery cells of the second battery cell assembly, and
wherein the first partition is configured to prevent propagation of thermal runaway between the first battery cell assembly and the second battery cell assembly.

2. The battery module of claim 1, wherein the plurality of battery cells in the first battery cell assembly and the second battery cell assembly are pouch cells, wherein electrode leads of opposite polarities protrude from both end of the pouch cells in the longitudinal direction.

3. The battery module of claim 2, wherein the number of the plurality of battery cells of each of the first battery cell assembly and the second battery cell assembly is an even number.

4. The battery module of claim 3, wherein each of the plurality of battery cells in the first battery cell assembly and the second battery cell assembly is electrically connected to the electrode leads of adjacent battery cells, so as to form an electrical path connected in a zigzag direction, respectively, and wherein both ends of the electrical path include the electrode leads protruding toward a gap between the first and second battery cell assemblies.

5. The battery module of claim 4, wherein the electrode leads protruding from the first and second battery cell assemblies have opposite polarities.

6. The battery module of claim 5, wherein a terminal busbar is coupled to the electrode leads protruding from the first and second battery cell assemblies.

7. The battery module of claim 4, wherein the electrode leads of adjacent battery cells are coupled through an inter busbar, so as to form the electrical path connected in the zigzag direction.

8. The battery module of claim 4, wherein the electrode leads of adjacent battery cells are configured to be directly coupled by being bent to contact each other, so as to form the electrical path connected in the zigzag direction.

9. The battery module of claim 1, wherein a second partition extending in the longitudinal direction of the module case is provided in a middle part of the plurality of battery cells stacked in the thickness direction of the first battery cell assembly and a second partition extending in the longitudinal direction is provided in a middle part of the plurality of battery cells stacked in the thickness direction of the second battery cell assembly.

10. A battery pack comprises:
a battery module stack including a plurality of battery modules according to claim 1,
wherein the plurality of battery modules are stacked in the thickness direction,
wherein a plurality of the first battery cell assemblies are electrically connected to each other, so as to constitute a first electric block, and a plurality of the second battery cell assemblies are electrically connected to each other, so as to constitute a second electric block, and wherein, except for a first battery assembly and a second battery assembly stacked at a top of the respective first electric block and the second electric block of the battery module stack, each of the plurality of first battery cell assemblies and each of the plurality of second battery cell assemblies, constituting the first electric block and the second electric block respectively, is not electrically connected to each other.

11. The battery pack of claim 10, wherein the first battery assembly and second battery cell assembly stacked at the top of the battery module stack are electrically connected by a high voltage busbar, so as to electrically connect the first electric block and the second electric block.

12. The battery pack of claim 10, wherein a first high voltage busbar electrically connecting the plurality of first battery cell assemblies to each other and a second high voltage busbar electrically connecting the plurality of second battery cell assemblies to each other are installed on each battery module in the thickness direction, so as to constitute the first electric block and the second electric block.

13. The battery pack of claim 12, wherein the first high voltage busbar is connected to a terminal busbar, the terminal busbar being coupled to an electrode lead protruding from the first battery cell assembly toward a gap between the first battery cell assembly and the second battery cell assembly of the battery module, and the second high voltage busbar is connected to a terminal busbar, the terminal busbar being coupled to an electrode lead protruding from the second battery cell assembly toward the gap between the first battery cell assembly and the second battery cell assembly of the battery module.

14. The battery pack of claim 10, wherein an electrical connection structure of the first and second battery cell assemblies is a 1PNS structure, wherein N is an even number.

15. The battery pack of claim 10 further comprises, a battery pack case configured to accommodate the battery module stack.

* * * * *